United States Patent [19]
DeLange et al.

[11] Patent Number: 4,996,469
[45] Date of Patent: Feb. 26, 1991

[54] ELECTRIC MOTOR CONTROLLER WITH BYPASS CONTACTOR

[75] Inventors: Robert J. DeLange, St. Francis; John C. Merrison, Wauwatosa, both of Wis.

[73] Assignee: Allen-Bradley Company, Inc., Milwaukee, Wis.

[21] Appl. No.: 495,018

[22] Filed: Mar. 16, 1990

[51] Int. Cl.$^5$ .......................... H02P 3/18; H02D 5/40
[52] U.S. Cl. .................................. 318/757; 318/763; 318/779
[58] Field of Search ............... 318/762, 759, 778, 706, 318/763, 757, 758, 779

[56] References Cited

U.S. PATENT DOCUMENTS

| | | | |
|---|---|---|---|
| 3,897,595 | 7/1975 | Fearno | 318/762 |
| 4,100,469 | 7/1978 | Nelson et al. | 318/227 |
| 4,417,191 | 11/1983 | Schmidt | 318/760 |
| 4,456,867 | 6/1984 | Mallick et al. | 318/778 |
| 4,540,921 | 9/1985 | Boyd, Jr. et al. | 318/254 |
| 4,560,913 | 12/1985 | Min | 318/759 |
| 4,683,411 | 7/1987 | Hamilton et al. | 318/706 |
| 4,833,386 | 5/1989 | Unsworth et al. | 318/763 |
| 4,857,814 | 8/1989 | Duncan | 318/281 |

Primary Examiner—William M. Shoop, Jr.
Assistant Examiner—John W. Cabeca
Attorney, Agent, or Firm—Quarles & Brady

[57] ABSTRACT

A three-phase motor controller includes a bidirectional thyristor switch to couple each phase of an electrical supply to a motor. The motor is started by rendering the thyristors conductive during successively greater portions of each cycle of AC electricity from the supply. In order to reduce the cooling requirements of the controller, a contactor is connected in parallel with the thyristors to provide apply electricity to the motor once it reaches full speed. When the controller receives a signal to stop the motor, the contactor is deactivated and the controller goes through a sequence to synchronize the thyristor triggering to the AC electricity. The synchronizing process provides a smooth transition from contractor control back to thyristor control of the application of electricity to the motor. Once thyristor control resumes, the controller executes a triggering routine which decreases the voltage applied to the motor and produces a braking effect.

11 Claims, 2 Drawing Sheets

ELECTRIC MOTOR CONTROLLER WITH BYPASS CONTACTOR

BACKGROUND OF THE INVENTION

The present invention relates to systems for controlling the application of power to alternating current electric motors; and in particular to such devices which provide a controlled starting and stopping of the motor.

A conventional motor controller has thyristors which connect the motor windings to alternating current supply lines. For a three-phase motor, each AC phase line usually is coupled to a separate winding within the motor by either a triac or a pair of inversely connected silicon controller rectifiers (SCR's). A circuit within the controller determines the proper time to trigger the thyristors during each half-cycle of the supply line voltage. The thyristors are triggered in sequence as determined by the phase relationship of the voltage on each supply line. The sequence is circular in that after each iteration of triggering all of the thyristors, the process repeats by re-triggering the SCR's in the same order. Once a thyristor is triggered it remains in a conductive state until the alternating current flowing therethrough makes a zero crossing at which time it must be retriggered to remain conductive. By regulating the trigger times of the thyristors with respect to the zero current crossings, the intervals during which they are conductive can be varied to control the amount of voltage applied to the motor.

To start the motor, conventional motor controllers vary the thyristor trigger times to provide a gradual increase in the voltage. In doing so, the thyristors are initially triggered relatively late in each voltage half-cycle so that they are conductive for only a short period. The trigger times then become progressively earlier in each half-cycle to render the thyristors conductive for longer intervals and apply greater amounts of voltage to the motor.

As the thyristors become triggered earlier in each half-cycle during starting, the motor speed increases until it reaches full speed. Many previous motor controllers continued to utilize the SCR's to apply electricity during full speed operation, in which the SCR's essentially are always in a conductive state. When the motor is at full speed, the SCR's produce a significant amount of heat, which must be dissipated. Therefore, for continuous operation a considerably larger heat sink is required and forced ventilation may be necessary so that excessive heat does not build up in the controller's enclosure.

To minimize the size of the heat sink and cooling requirements, hybrid solid state controllers and contactor systems were devised. One such system is described in U.S. Pat. No. 4,100,469. That system has a acceleration circuit which started the motor by regulating the triggering of SCR's in the previously described manner. However when the motor reaches full synchronous speed, a set of contactors in parallel with the SCR's closes and the SCR triggering is discontinued. Therefore a full speed the motor current flows through the contactors, not the SCR's and the SCR's do not generate heat which must be dissipated.

More recently solid state motor controllers have been employed to provide a maneuver to stop the motor. For example, an SCR triggering method inverse to that used to start the motor can be used to stop it. That is, the SCR's are triggered successively later during each voltage half-cycle to apply progressively smaller amounts of power to the motor. Alternatively, a cycle-skipping technique can be employed to reduce the motor speed. However, these deceleration techniques previously could only be employed readily with controllers which continued to trigger the SCR's during full speed operation. In the hybrid system, once the contractor closed and the SCR triggering ceased, the control circuit lost synchronization with the AC supply line voltage. As a result, the control circuit could not be used to smoothly brake the motor since it did not know where to begin the pattern of SCR triggering at the start of the deceleration. Unless the controller knows at which point of the sequence to begin triggering the SCR's, a smooth transition to SCR control can not occur and the motor may abruptly jerk the equipment driven by it.

SUMMARY OF THE INVENTION

A controller regulates the application of electricity to brake a motor from the full speed operation bringing it to a gradual stop. A thyristor switch assembly couples the motor to each phase of the electrical supply. The thyristors are triggered into a conductive state by a control circuit to apply electricity to the motor. By sequentially altering the relative times during each half-cycle of the supply voltage at which the thyristors are triggered, their conduction periods can be varied to provide a controlled increase or decrease in motor speed. A contactor assembly also connects the motor to each phase of the electrical supply, in parallel with the thyristor switch assembly.

The motor controller can start the motor by triggering the thyristors to progressively increase the voltage applied to the motor. Once the motor reaches substantially full speed, the control circuit activates the contactor assembly and discontinues triggering the thyristor switch assembly. As the electricity now is fed to the motor through the contactor assembly, heat is not generated by the thyristor switch assembly and does not have to be dissipated.

When the motor controller receives a signal to stop the motor, the contactor assembly is deactivated to disconnect the motor from the supply. A mechanism tests the voltage across thyristor switch assembly in each electrical phase to detect when the contactor assembly actually disconnects the motor. When this event is detected, the control circuit briefly triggers all of the thyristors in the switch assembly.

The voltage across the thyristors in each electrical supply phase are sensed by a means which detects the first phase of the switch assembly to become non-conducting. The control circuit then triggers the thyristors in the switch assembly for this phase. The detection of the first phase to become non-conducting is used to determine at what point to enter the thyristor triggering sequence for a smooth transition from contactor assembly control to thyristor switch means control of the application of electricity to the motor.

A general object of the present invention is to provide a hybrid motor controller having both a contactor and a thyristor switch assembly for applying electricity to the motor.

Another object is to provide a mechanism for a soft stoppage of the motor.

Yet another object is to provide a means for making a transition from the contactor applying electricity to the motor to application by the thyristor switch assembly. The transition is in such a manner that the equipment driven by the motor does not experience a sudden change in motor torque.

A further object of the present invention is to incorporate the ability into the motor controller to synchronize triggering of the thyristors to the supply line phase voltage at the time of the transition when the contactor discontinues applying electricity to the motor.

DETAILED DESCRIPTION OF THE INVENTION

Figure 1:
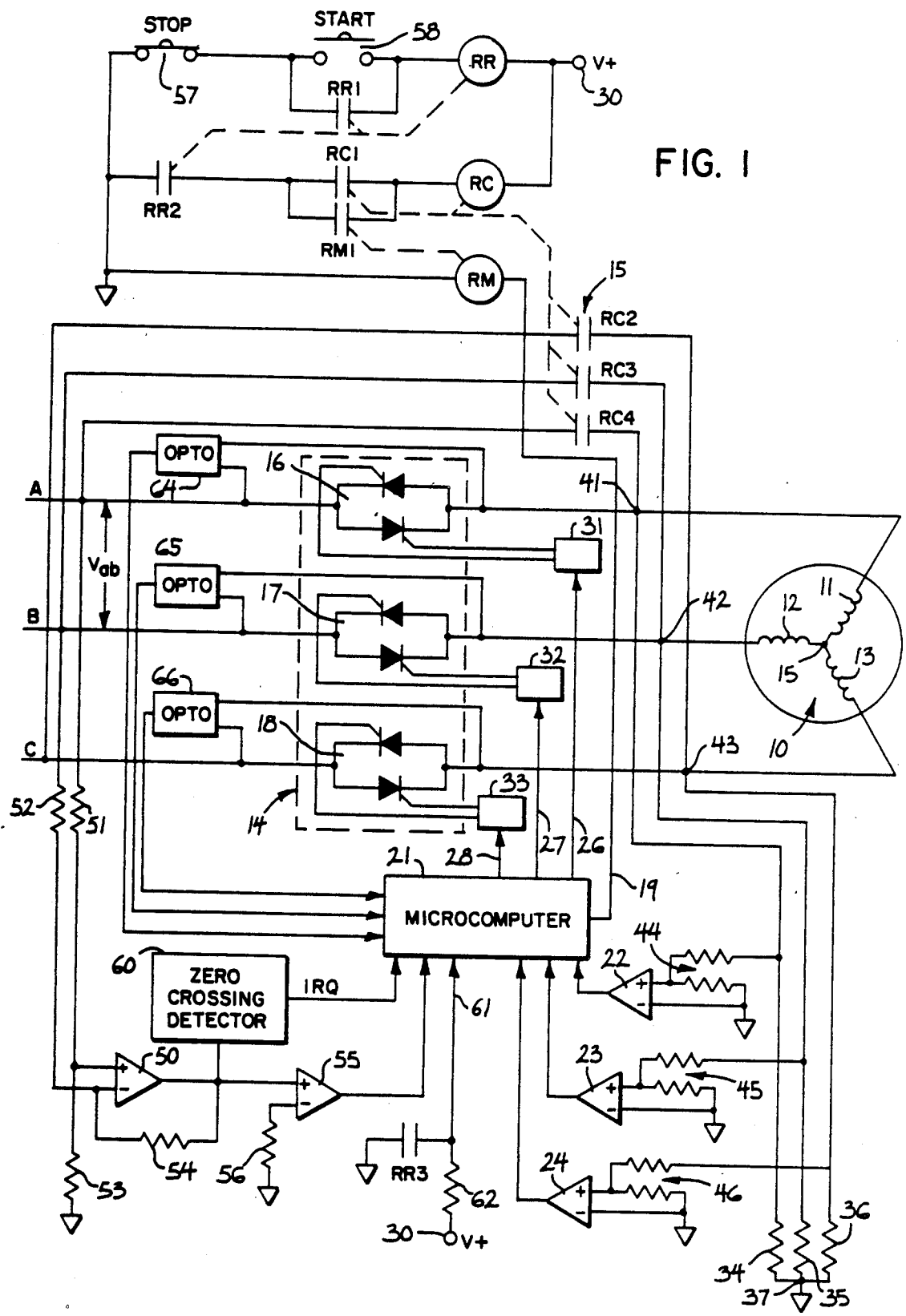
FIG. 1 is a schematic diagram of a motor control circuit for practicing the present invention.

The present invention will be described in the context of the exemplary motor controller 20 shown in FIG. 1. An alternating current electric motor 10 has three motor stator windings 11-13, which are connected to a source of three-phase electricity by a thyristor switch module 14 and three supply lines designated A, B, and C. The switch module 14 has three pairs of inverse-parallel connected SCR's 16, 17, and 18. The SCR's in each pair couple one of the supply lines A, B, or C to a different stator winding 11, 12, or 13, respectively. Depending on the level of current to be controlled, a triac can be used in place of each pair of SCR's.

The SCR pairs 16-18 are operated by a control circuit that includes a microcomputer 21, voltage comparators 22, 23, 24 and 55, a zero voltage crossing detector 60 and a differential amplifier 50. The microcomputer 21 may be one of several commercially available types which contain a timer circuit, a read only memory, and a random access memory in the same integrated circuit package. The program for controlling the operation of the motor controller 20 is stored in the read only memory and will be described in greater detail with respect to the operation of the motor controller.

The microcomputer 21 generates properly timed thyristor trigger pulses on three lines 26, 27, and 28 of a parallel output port. Each trigger pulse has a relatively short duration being just long enough to place the corresponding SCR in a conductive state, in which it remains until the magnitude of the alternating current flowing through the SCR goes to zero. The first output line 26 is coupled by a first pulse transformer 31 to the gate terminals of the first pair of SCR's 16 for electricity supply line A. The other trigger output lines 27 and 28 are coupled by similar pulse transformers 32 and 33 to the gate terminals of the second and third SCR pairs 17 and 18, respectively, for electricity supply lines B and C.

Three terminals 41, 42, and 43 couple each of the stator windings 11-13 to the motor controller 20. Three equal value resistors 34-36 are coupled to terminals 41-43 in a Y connection with the common node 37 of the Y connected to the ground of the control circuit. The voltage across each resistor 34, 35, and 36 equals the voltage across each of the three stator windings 11, 12, and 13, respectively. The potential at the common node 37 of the Y resistor connection is the same as at the neutral node 15 of the motor windings, which is substantially equal to ground potential.

Three comparators 22, 23 and 24 sense the voltage across the stator windings 11-13. The non-inverting input of each voltage comparator 22, 23, and 24 is coupled by a separate voltage divider 44, 45, or 46 to one of the stator winding terminals 41, 42, or 43, respectively. The voltage dividers 44-46 reduce the stator winding voltages to levels compatible with the comparators 22, 23, and 24. The inverting inputs of the three voltage comparators are connected directly to the circuit ground. The outputs of comparators 22, 23, and 24 are connected to separate lines of a parallel input port of the microcomputer 21.

The A and B supply lines are separately coupled by resistors 51 and 52 to the non-inverting and inverting inputs of a differential amplifier 50. The non-inverting input is also coupled to the circuit ground by resistor 53. A feedback resistor 54 is connected between the output of the differential amplifier 50 and its inverting input. The output of the differential amplifier 50 is connected to the non-inverting input of voltage comparator 55 whose inverting input is coupled to ground by resistor 56. The output of voltage comparator 55 is connected to another line of the microcomputer parallel input port. The level of this input indicates the polarity of the voltage Vab across A and B supply lines with respect to ground. The output of the differential amplifier 50 is further connected to a zero crossing detector 60 which senses when the voltage output of the differential amplifier, and hence the voltage Vab across supply lines A and B, goes through zero volts. The output signal from the zero crossing detector 60 is connected to an interrupt input (IRQ) of the microcomputer 21. As the alternating voltage across supply lines B-C and A-C have a fixed phase relationship to the voltage across supply lines A-B, the times at which the other voltage make zero crossings can be derived by the microcomputer from the signal at its interrupt input.

The motor 10 also is coupled to supply lines A, B and C by a three-phase contactor 15 having three sets of normally open contacts RC2, RC3 and RC4. These three contacts are actuated by a first relay coil RC which also actuates another set of contacts RC1. The first relay coil RC is connected in series with normal open contacts RC1 and yet another set of normally open contacts RR2 between the circuit ground and a source 30 of positive control voltage V+. A second relay coil RR is connected in series with a normally closed push button switch 57 and a normally open pushbutton switch 58 between circuit ground and voltage source 30. A set of normally open relay contacts RR1 are connected in parallel with the normally open switch 58. Sets of contacts RR1 and RR2 are activated by the second relay coil RR.

The second relay coil RR also activates a third set of normally open contacts RR3 connected between circuit ground and an input 61 of the microcomputer 21. This input 61 also is coupled by a pull-up resistor 62 to the positive voltage source 30. The microcomputer 21 has an output line 19 coupled to a third relay coil RM which activates a set of contacts RM1 connected in parallel across the set of normally open contacts RC1.

When the user wishes to start the motor 10, push button switch 58 is closed, which applies current through relay coil RR. When relay coil RR is energized, contacts RR1 close shorting the start switch 58 and latching the coil in an energized state. In this state, relay coil RR also closes contacts RR2, but at this time both sets of contacts RC1 and RM1 remain in a normally open state.

Energizing relay coil RR also closes contacts RR3 which signals the microcomputer 21 to begin executing a conventional motor starting software routine. During motor starting, the SCR pairs are triggered in a defined circular sequence according to the phase relationships of the voltage on the three supply lines. The software routine gradually triggers each of the SCR pairs 16–17 successively earlier in each half-cycle of the voltage on the supply line A, B or C to which each SCR pair is coupled. Eventually, each of the SCR pairs will be triggered so that they are conductive for substantially the entire half-cycle of the supply line voltage during which they are forward biased. When this occurs, the motor has substantially reached its full running speed.

At this time, the microcomputer 21 applies a high logic level to output line 19 which energizes relay coil RM closing contacts RM1. As contacts RR2 are already in a closed state, closing contacts RM1 applies current to energize relay coil RC. When relay coil RC is energized, contacts RC1 close so that current will continue to flow through the coil, regardless of the signal on microcomputer output line 19 and the state of contacts RM1 controlled by that signal. The activation of relay coil RC also closes the contactor contacts RC2, RC3 and RC4. The contacts of contactor 15 provide conduction paths for the electricity from the supply lines A, B and C to the motor 10 bypassing the thyristor switch module 14.

Thereafter, just prior to issuing a trigger signal to an SCR pair 16, 17 or 18, the microcomputer 21 inspects the signal produced by an opto-coupler 64, 65 or 66 coupled across that SCR pair. Each opto-coupler produces an output signal when the associated SCR pair 16–18 and contactor contacts RC2–RC4 are not conducting (i.e. a high voltage exists across the SCR's). The opto-couplers 64–66 sensing a high voltage across an SCR pair indicates that at least one of the contacts RC2, RC3 or RC4 of contactor 15 has not closed to provide a bypass electrical path. Therefore, the microcomputer 21 continues sending trigger signals sequentially on lines 26–28 to the thyristor switch module 14. Once all of the opto-couplers 64–66 indicate zero volts across every SCR pair, the microcomputer terminates the SCR triggering and applies a low logic level to line 19 opening contacts RM1. Since contacts RC1 now are closed, the relay coil RC remains energized keeping the contactor 15 closed. Alternatively, the microcomputer 21 can continue to apply a high level on line 19 to maintain contacts RM1 closed. With this alternative, contacts RC1 are not required. At this point in time, the motor 10 is directly coupled to each of the supply lines A, B and C via the set of contacts RC2, RC3 and RC4.

Figure 2:
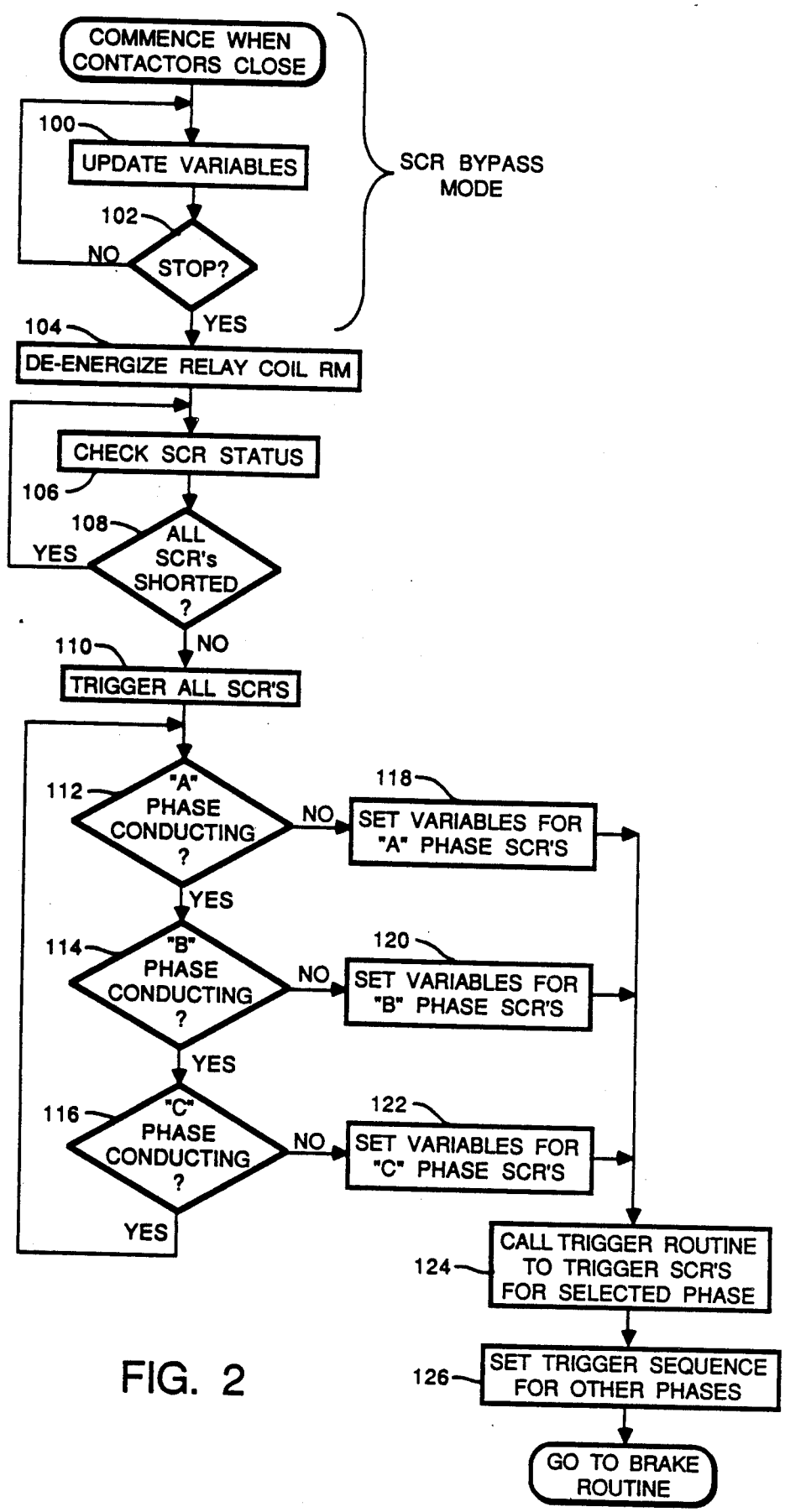
FIG. 2 is a flowchart of the motor control circuit operation for the transition from contactor control to microcomputer control to stop the motor.

The microcomputer 21 then advances from executing the motor starting software routine to the routine depicted by the flowchart of FIG. 2. The execution of the latter routine commences with a program loop that is executed while the motor controller 20 is in the SCR bypass mode in which the contactor 15 couples the motor to the supply lines. Although in this mode of operation the microcomputer is not triggering the SCR's, it continues to sense zero crossings of the supply line voltage Vab as indicated by the output from the zero crossing detector 60 and to sense the polarity of the supply line voltage as indicated by the output of comparator 55. The zero crossing indication as well as the polarity of the supply line voltage are used to update variables at step 100 which are employed in an SCR triggering subroutine. Therefore, even though the SCR's are not being triggered, the line voltage timing and phase indication variables continue to be updated so that the system remains synchronized to the supply line voltage. However, other electrical parameters such as the zero current crossings in each phase are not being sensed at this time.

In the SCR bypass mode, the microcomputer 21 periodically inspects input 61 to which relay contacts RR3 are connected to determine at step 102 whether the user has activated switch 57 to stop the motor 10. As long as the switch 57 has not been activated, the motor controller 20 remains in the SCR bypass mode and the program execution returns to step 100 to update the variables again.

When the motor 10 is to be stopped, switch 57 is opened momentarily to disconnect the current to relay coil RR. This action opens contacts RR1 and RR3, respectively, unlatching the relay coil RR and signaling the microcomputer 21 that the motor 10 should be stopped. The microcomputer responds by de-energizing relay coil RM if it remains activated at step 104. Contacts RR2 also open at this time disconnecting the current to relay coil RC which in turn opens contacts RC2, RC3 and RC4 of the contactor 15. This latter action cuts off the supply of electricity to motor 10.

However, the opening of the contactor 15 is not instantaneous and must be detected at steps 106 and 108 before advancing farther. At the first of these steps 106, the microcomputer 21 inspects each of its inputs from the three opto-couplers 64–66. If these inputs indicate that none of the opto-couplers is sensing a relatively high voltage drop across an SCR pair 16, 17 or 18, none of the contacts within contactor 15 has opened. Therefore, at step 108, if all of the SCR pairs remain shorted by the contactor, the program execution returns to step 106 continuing to check inputs from the opto-couplers. Eventually, one or more of the contactors within set 15 will open producing the relatively high supply line voltage across corresponding pair of SCR's. When the associated opto-coupler senses this occurrence, the program execution exits the loop by advancing from step 108 to step 110. Although some of the variables used in the SCR triggering subroutine have been updated periodically, the microcomputer 21 must resynchronize the execution of the SCR triggering routine to the three-phase electricity being supplied by lines A, B and C. To do so, all three pairs of SCR's 16, 17 and 18 are simultaneously triggered at step 110 by issuing trigger signals on output lines 26, 27 and 28 at essentially the same time. Thereafter, the first pair of the SCR's to become non-conducting provides a synchronizing indicia which can be used to determine where to enter the triggering sequence to make a smooth transition between the bypass and stopping modes. Unless a smooth transition occurs, the motor torque may change abruptly, jerking the driven equipment.

Once all of the SCR's have been triggered, the execution of the software routine of FIG. 2 enters another loop consisting of decision steps 112, 114 and 116. In each of these steps, the output from a different opto-coupler 64, 65 or 66 is inspected by the microcomputer 21 to determine if the associated pair of SCR's is non-conducting. The program continues to loop through these three decision steps 112–116 until one of the opto-couplers indicates that a pair of SCR's for an electrical supply phase is not conducting. At that occurrence, the program execution branches from the associated decision step 112, 114 or 116 to step 118, 120 or 122, respectively. In the selected one of these latter steps, the variables for the SCR triggering sequence are set so that the pair of SCR's which was found to be non-conducting will be the next pair that is triggered by the microcomputer 21. After the SCR triggering variables have been set in one of the steps 118, 120 or 122, the microcomputer calls the SCR triggering subroutine at step 124 so that the pair of SCR's which is now non-conducting will be triggered. This continues the application of electricity to the motor as though the contactor set 15 remained closed.

The first SCR pair turning off after step 110 also indicates how to enter the circular SCR triggering sequence to become synchronized with the supply line phases. At step 126, the microcomputer sets up the variables for the triggering subroutine. In doing so, the subroutine is configured to next trigger the SCR pair which follows the pair triggered at step 124 in the defined triggering sequence. The next SCR pair will be triggered when its phase current goes to zero. The program execution may remain in step 126 for a short period of time wherein the SCR's are triggered to apply the full line voltage to the motor. This keeps the motor at full synchronous speed mode for a brief interval to insure that the triggering sequence has properly synchronized to the three-phase supply line voltage.

Thereafter, the microcomputer 21 begins executing one of several known control maneuvers to bring the motor to a stop. For example, such a maneuver can gradually decrease the magnitude of the voltage applied to the motor 10 by triggering the SCR pairs successively later during each half-cycle of the alternating supply line voltage. This maneuver decreases the effective voltage applied to the motor. Alternatively, a cycle skipping based motor braking maneuver may be used as described in U.S. Pat. application Ser. No. 07/380,050 entitled "Electric Motor Speed Control Apparatus and Method".

As a result of the present invention provides a smooth transition from the application of electricity to a motor by a contactor mechanism to the use of a solid state motor controller which triggers thyristors to apply the electricity. This mechanism insures a smooth transition between contactor and motor controller operation so that the load being driven by the motor will not have an abrupt torque change applied to it at the time of the transition. Therefore, the controller 20 provides a control system for a motor which utilizes a contactor mechanism during full speed operation, thereby avoiding the necessity to design the control circuit and its enclosure in order to dissipate a relatively large amount of heat during this mode and yet provides the controlled stopping capabilities of the solid state motor controller.

We claim:

1. An apparatus for controlling an electric motor which is supplied by a source of alternating voltage, said apparatus comprising: of alternating voltage to the motor in response to a control signal;
   a thyristor switch means for selectively coupling the source of alternating voltage to the motor in response to a trigger signal;
   a control circuit for operating said contactor assembly and said thyristor switch means, and including:
   (a) a first means for producing the control signal for said contactor assembly, and being responsive to a command to stop the motor by discontinuing the production of the control signal for said contactor means; and
   (b) a second means, responsive to the command to stop the motor, for producing trigger signals for said thyristor switch means to reduce the speed of the motor; and
   (c) means for synchronizing the production of trigger signals by said stopping means to the alternating voltage.

2. The apparatus as recited in claim 1 wherein said second means produces a series trigger signals which places said thyristor switch means in a conductive state during progressively shorter intervals during each half-cycle of the alternating voltage.

3. The apparatus as recited in claim 1 wherein said second means utilizes voltage cycle skipping to reduce the speed of the motor.

4. The apparatus as recited in claim 1 wherein said means for synchronizing responds to the stop command by applying a pulse of the trigger signal to said thyristor switch means, and then detects when said thyristor switch means becomes non-conducting.

5. The apparatus as recited in claim 4 wherein said second means is responsive to said means for synchronizing detecting that said thyristor switch means have become non-conducting.

6. The apparatus as recited in claim 1 wherein said first means produces the control signal so that said contactor assembly is activated only when the motor is operating above a predefined speed.

7. An apparatus for controlling an electric motor which is supplied by a three-phase source of alternating voltage, said apparatus comprising:
   a contactor for selectively connecting the source of alternating voltage to the motor in response to a control signal;
   three thyristor switch means, each one for selectively coupling a phase of the source of alternating voltage to the motor in response to a trigger signal;
   a control circuit for operating said contactor and said thyristor switch means, and having a first mode of operation for starting said motor by producing a series trigger signals which place said thyristor switch means in a conductive state during progressively longer intervals during half-cycles of the alternating voltage, a second mode in which the trigger signals are not being produced and in which said control circuit produces the control signal causing said contactor to connect the source of alternating voltage to the motor, and a third mode for stopping the motor in which said contactor is deactivated and said thyristor switch means are triggered in a defined sequence to reduce the speed of the motor.
   motor stoppage initiation means for translating the control circuit from the second mode to the third mode by triggering all of said thyristor switch means substantially simultaneously, detecting which one of said thyristor switch means becomes non-conducting first, and beginning the triggering by the control circuit at a point in the defined sequence where the one thyristor switch means is triggered.

8. The apparatus as recited in claim 7 wherein said control circuit in the third mode triggers said thyristor switch means into a conductive state for progressively shorter intervals during each half-cycle of the alternating voltage.

9. An apparatus for controlling an electric motor which is supplied by a three-phase source of alternating electricity, said apparatus comprising:
- a contactor assembly connecting each phase of the source of alternating electricity to the motor in response to a control signal;
- three thyristor switch means, each coupling one phase of the source to the motor when rendered conductive by a trigger signal;
- a control circuit for operating said contactor assembly and said three thyristor switch means, and including:
  - (a) means for discontinuing the application of the control signal to the contactor assembly in response to a command to stop the motor;
  - (b) means for sensing when said contactor assembly is not connecting at least one of the source phases to the motor;
  - (c) means, responsive to said means for sensing, for triggering said three thyristor switch means substantially at the same time;
  - (d) means for detecting when one of the thyristor switch means is not conducting electricity after being triggered; and
  - (e) means for triggering each of said thyristor switch means in a given sequence to reduce the speed of the motor, wherein the triggering commences at a point in the sequence whereat the one thyristor switch means is triggered first.

10. A method for controlling the speed of an electric motor which is selectively coupled to a three-phase source of alternating electricity by a contactor and three thyristor switch means, said method comprising:
- activating the contactor to couple the motor to the source;
- deactivating the contactor in response to a command to stop the motor;
- thereafter triggering the thyristor switch means;
- detecting the first one of the triggered thyristor switch means to become non-conducting;
- retriggering the first one of the thyristor switch means; and
- thereafter, sequentially triggering each of the thyristor switch means in a pattern which reduces the speed of the motor.

11. The method as recited in claim 10 wherein the ultimate step triggers the thyristor switch means in a circular sequence with the step entering the sequence at a point determined by the first one of the thyristor switch means to become non-conducting.

* * * * *

UNITED STATES PATENT AND TRADEMARK OFFICE
CERTIFICATE OF CORRECTION

PATENT NO. : 4,996,469

DATED : February 26, 1991

INVENTOR(S) : Robert J. DeLange et al.

It is certified that error appears in the above-identified patent and that said Letters Patent is hereby corrected as shown below:

In Column 7,
at Line 57, after "comprising:" insert --a contactor assembly for selectively connecting the source--.

Signed and Sealed this

Eighth Day of September, 1992

Attest:

DOUGLAS B. COMER

Attesting Officer

Acting Commissioner of Patents and Trademarks